No. 696,849. Patented Apr. 1, 1902.
H. G. UNDERWOOD.
REVERSING AND VARIABLE SPEED GEARING.
(Application filed Oct. 23, 1901.)
(No Model.) 2 Sheets—Sheet 2.

Witnesses
Inventor.
H. G. Underwood,
By
Attorney.

UNITED STATES PATENT OFFICE.

HERBERT GEORGE UNDERWOOD, OF STAMFORD, CONNECTICUT, ASSIGNOR TO INTERNATIONAL POWER VEHICLE COMPANY, OF STAMFORD, CONNECTICUT, A CORPORATION OF WEST VIRGINIA.

REVERSING AND VARIABLE-SPEED GEARING.

SPECIFICATION forming part of Letters Patent No. 696,849, dated April 1, 1902.

Application filed October 23, 1901. Serial No. 79,711. (No model.)

*To all whom it may concern:*

Be it known that I, HERBERT GEORGE UNDERWOOD, a citizen of the United States of America, and a resident of Stamford, county of Fairfield, State of Connecticut, have invented certain new and useful Improvements in Reversing and Variable-Speed Gearing, of which the following is a specification.

My invention relates to that type of friction-gearing in which the periphery of a driving-pulley bears upon the face of a revolving disk and wherein by varying the position of the pulley radially in respect to the disk a variation in the relative speed of the pulley and disk is effected, and it thus provides a reversing and variable-speed gearing.

My object is to provide a device of the character specified in which the bearing between the pulley and disk has a variable pressure dependent upon the amount of work to be transmitted thereby; and for this purpose it consists in the construction, arrangement, and combination of the several parts of which it is composed, as will be hereinafter more fully described and claimed.

Figure 1:
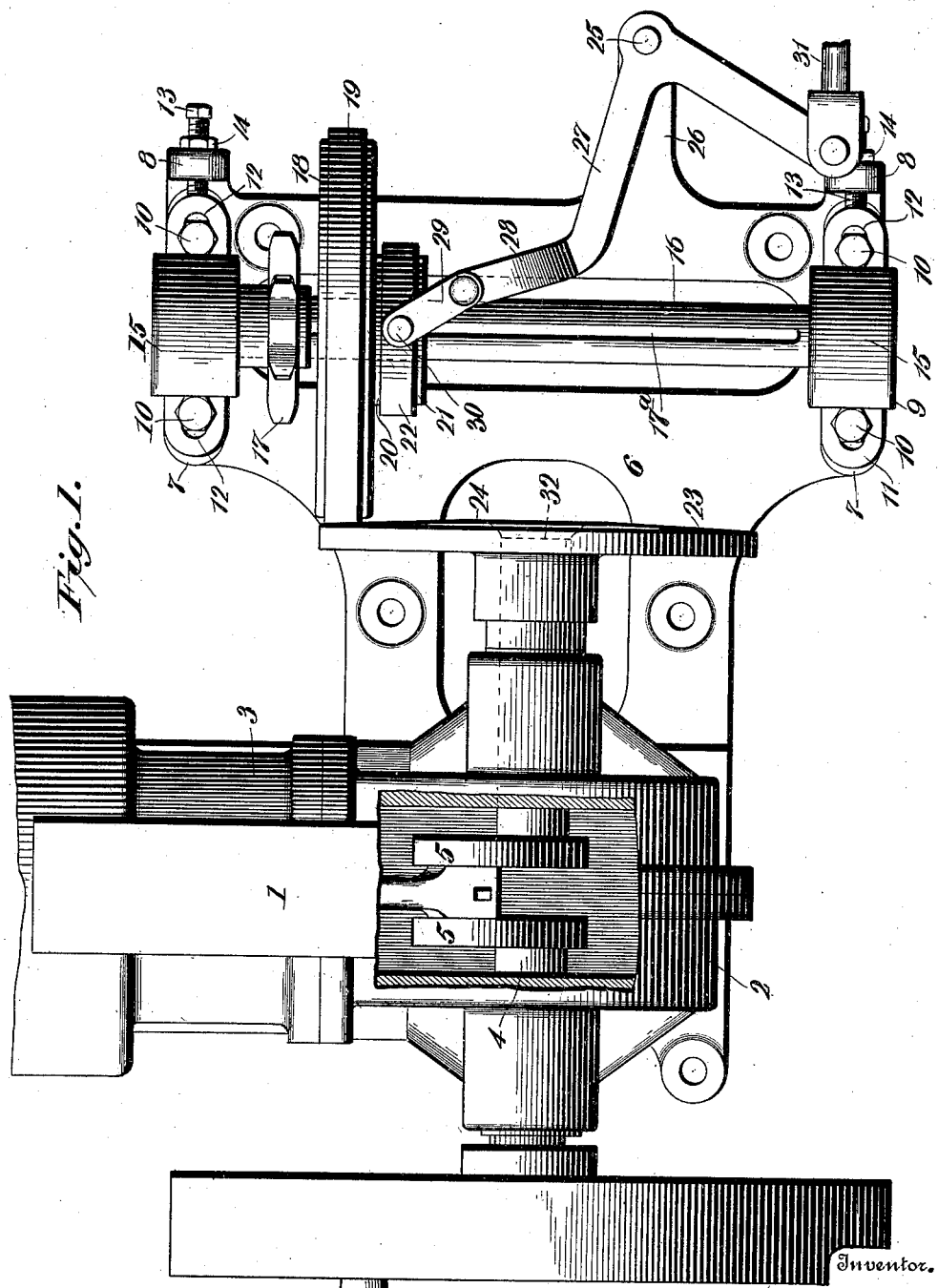
Figure 2:
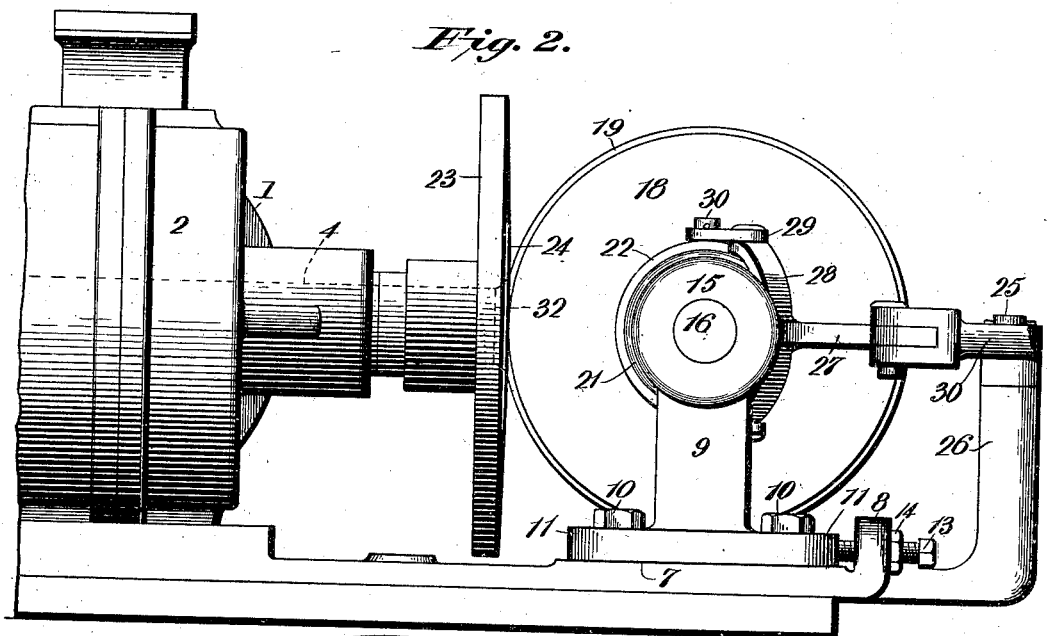
Figure 3:
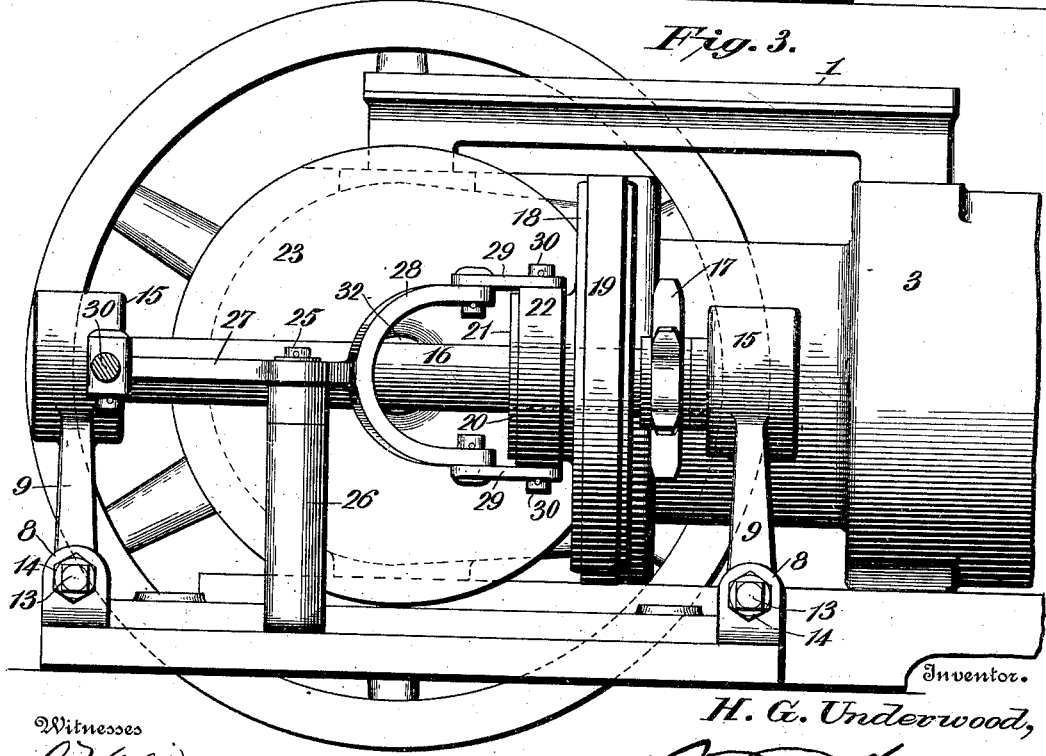

Referring to the accompanying drawings, in which corresponding parts are designated by corresponding marks of reference, Figure 1 shows my invention in plan view as applied to an explosive-engine—such, for instance, of the character described in my Patent No. 666,827, issued to my assignee, the International Power Vehicle Company, on the 29th day of January, 1901. Fig. 2 is an end elevation thereof, and Fig. 3 is a side elevation.

The engine structure 1 is substantially similar to that described in my said patent—that is to say, a closed extension 2 upon the forward end of the cylinder 3 constitutes a bearing for the main shaft 4, which is provided between the bearings with thrust-collars 5.

A bracket 6 is provided upon one side of the extension, having thereon two planed seats 7, the base of the bracket being provided opposite to one end of each of the seats with a lug 8. Standards 9, having planed bases, are bolted to the seats by means of bolts 10 passing through ears 11 on the bases of the standards and through elongated slots 12 in the bracket. Set-screws 13, provided with lock-nuts 14, project through the lugs and bear on the corresponding end of the ears upon the standards, whereby the position of the standards may be accurately adjusted before being firmly clamped by the bolts 10.

Bearings 15 are formed in the upper ends of the standards and receive a cross-shaft 16, carrying a sprocket 17 near one end and splined throughout the greater part of its length, as at 17ª. A pulley 18, having a yielding periphery 19, which may be of leather, is feathered upon the spline of the shaft and has an annular groove 20 formed in a side extension 21 thereof, the said groove receiving a collar 22.

One end of the main shaft, which is at right angles with the cross-shaft 16, projects beyond the extension 2 of the engine structure and receives a disk 23. Instead of forming the outer face of this disk flat, as has been usual, I bevel or crown the said face, as at 24, the extent of beveling depending upon the work to be transmitted through the gearing, and as the cross-shaft 16 is rigidly held in relation to the face of the driving-disk it follows that the friction between the disk and pulley varies with the position of the pulley on the disk.

Upon an arm 25, arising from the standard-bracket 26, I pivot a cranked lever 27, one end of said lever being bifurcated, as at 28, and loosely connected to the collar 22 by means of links 29, engaged by pins 30 on the said collar. The free end of the lever is connected with a rod 31, by which the pulley may be shifted along the cross-shaft, and thus its point of bearing upon the disk be varied, effecting a corresponding change in the relative velocities of the driving-disk and driven pulley, and whereby on shifting the pulley from one side of the center of the disk to the other the relative motions of the pulley and disk may be reversed and whereby on moving the pulley into the axial line of the main shaft the pulley may be stopped, as is well known. This is of especial importance when an explosive-engine is the source of power, as such engines are started and stopped and reversed with difficulty. For the purpose of reducing friction in the gearing when it is thus used as a clutch I recess the center of the pulley, as at 32, thus creating a depression in which the pulley may rest at the time specified. It will be noted that the recess specified might be used with advantage in connection with flat disks; but it is of especial value in connection with crowned disks, as with such devices the maximum of friction would otherwise exist when the pulley is bearing on the center of the disk. It will be seen that by the adjusting-screws 13 I provide for placing the cross-shaft diametrical to the disk with great accuracy.

When my invention is used to transmit motion to the wheels of motor-vehicles, for which purpose I have especially designed it, it provides for an increased friction between the two members at the time when the pulley is being given a relatively small speed. As with motor-vehicles slow speed is generally attendant upon increased expenditure of power in climbing hills, it will be seen that I provide means whereby the bearing in the gearing varies with the power transmitted therethrough. When used for the purpose indicated, the sprocket 17 will be connected to the driving-wheels of the vehicle.

Having thus described my invention, what I claim as new, and desire to secure by Letters Patent, is—

1. In a friction-gearing, the combination with a driving crowned disk, of a rigidly-supported cross-shaft, and a pulley having a movement upon the said shaft and across the face of the said disk, from side to side thereof, substantially as described.

2. In a friction-gearing, the combination with a driving crowned disk, of a rigidly-supported cross-shaft, and a driven pulley mounted thereon and having a movement on the said shaft and across the said disk, from side to side thereof, the periphery of the said pulley being of yielding material whereby this movement is permitted, substantially as described.

3. The combination with a main shaft, of bearings therefor, a bracket projecting from the said bearings and having planed seats thereon, standards adjustably secured to the planed seat of the bracket, a cross-shaft mounted in said standards, a driving-disk mounted on the end of the main shaft, and having a crowned face and a pulley movable upon the said cross-shaft and across the face of the disk, from side to side thereof, substantially as described.

4. The combination with a main shaft, of bearings therefor, a bracket projecting from the said bearings and having planed seats thereon, and lugs adjacent to said seats, standards adjustably secured to the planed seats of the brackets, adjusting-screws taking into the lugs and bearing upon the said standards, a cross-shaft mounted in the said standards, a driving-disk mounted on the end of the main shaft, and having a crowned face and a pulley movable upon the said cross-shaft and across the face of the disk, from side to side thereof, substantially as described.

5. The combination with a main shaft, of bearings therefor, a bracket projecting from the said bearings, a driving-disk having a crowned face mounted on the end of the main shaft, a cross-shaft rigidly mounted in the bracket, a pulley, mounted on the cross-shaft to move thereon, and having a yielding face and provided with a groove, a collar mounted in the said groove in the pulley, and a lever pivoted to the said bracket and loosely connected to the said collar whereby the pulley may be shifted along the cross-shaft and across the face of the disk, from side to side thereof, substantially as described.

6. In a friction and clutch gearing, the combination with a driving crowned disk, having a central depression in its face, of a rigidly-supported cross-shaft, and a pulley having a movement across the face of the said disk from side to side thereof, substantially as described.

Signed at Stamford, Connecticut, this 14th day of October, 1901.

HERBERT GEORGE UNDERWOOD.

Witnesses:
FRANK B. GURLEY,
WM. F. WATERBURY.